(12) United States Patent
Le et al.

(10) Patent No.: US 10,005,251 B2
(45) Date of Patent: *Jun. 26, 2018

(54) DECORATED SOLE ELEMENTS FOR ARTICLES OF FOOTWEAR AND PROCESSES FOR MAKING THEREOF

(71) Applicant: Nike, Inc., Beaverton, OR (US)

(72) Inventors: Tony H. Le, Portland, OR (US); Susan D. Cessor, Lake Oswego, OR (US); Namkook Kim, Busan (KR)

(73) Assignee: NIKE, Inc., Beaverton, OR (US)

( * ) Notice: Subject to any disclaimer, the term of this patent is extended or adjusted under 35 U.S.C. 154(b) by 73 days.

This patent is subject to a terminal disclaimer.

(21) Appl. No.: 15/007,503

(22) Filed: Jan. 27, 2016

(65) Prior Publication Data
US 2016/0135536 A1 May 19, 2016

Related U.S. Application Data

(63) Continuation of application No. 12/271,166, filed on Nov. 14, 2008, now Pat. No. 9,931,804.

(51) Int. Cl.
| | |
|---|---|
| *A43B 13/18* | (2006.01) |
| *A43B 13/12* | (2006.01) |
| *B29D 35/14* | (2010.01) |
| *A43B 1/00* | (2006.01) |
| *A43B 3/00* | (2006.01) |

(Continued)

(52) U.S. Cl.
CPC .......... *B29D 35/142* (2013.01); *A43B 1/0027* (2013.01); *A43B 3/0078* (2013.01); *A43B 13/12* (2013.01); *A43B 13/125* (2013.01); *A43B 13/127* (2013.01); *A43B 23/24* (2013.01); *B29D 35/0009* (2013.01); *B29D 35/0054* (2013.01)

(58) Field of Classification Search
CPC ... A43B 3/0078; A43B 13/125; A43B 13/127; A43B 23/24; A43B 3/0036; A43B 3/0084; A43B 1/0027; A43B 1/0036; A43B 13/12; B29D 35/142; B29D 35/0009; B29D 35/0054
USPC ... 36/28, 30 A, 30 R, 31, 98, 103, 112, 114, 36/136
See application file for complete search history.

(56) References Cited

U.S. PATENT DOCUMENTS

| | | | |
|---|---|---|---|
| 5,393,372 | A | 2/1995 | Ammon |
| 5,586,354 | A | 12/1996 | Chi |
| 5,647,150 | A | 7/1997 | Romanato et al. |

(Continued)

FOREIGN PATENT DOCUMENTS

| | | |
|---|---|---|
| CN | 1485197 A | 3/2004 |
| EP | 1403032 A1 | 3/2004 |

(Continued)

*Primary Examiner* — Jameson Collier
(74) *Attorney, Agent, or Firm* — Banner & Witcoff, Ltd.

(57) ABSTRACT

A method of forming a decorated midsole element for articles of footwear includes obtaining a decorated film having one or more graphic elements applied to a first surface of the film and placing the decorated film in a mold. A midsole element is obtained and placed in the mold, and pressure is applied to the mold to form a midsole element having a decorated surface. The decorated film may include a layer of polyether-block co-polyamide polymer and the midsole element may be formed of ethylvinylacetate. A midsole assembly and an article of footwear having decorated midsole top layers are also described.

20 Claims, 5 Drawing Sheets

(51) Int. Cl.
   *A43B 23/24*      (2006.01)
   *B29D 35/00*      (2010.01)

(56) References Cited

U.S. PATENT DOCUMENTS

| | | | |
|---|---|---|---|
| 6,032,388 A | 3/2000 | Fram | |
| 6,299,962 B1 * | 10/2001 | Davis | A43B 23/0255 |
| | | | 12/142 P |
| 6,539,646 B2 | 4/2003 | Brooks et al. | |
| 6,568,102 B1 | 5/2003 | Healy et al. | |
| 6,633,019 B1 * | 10/2003 | Gray | B41M 5/24 |
| | | | 219/121.69 |
| 6,761,845 B2 | 7/2004 | Cheng | |
| 6,811,734 B2 | 11/2004 | Kelley | |
| 6,954,998 B1 | 10/2005 | Lussier | |
| 6,964,120 B2 | 11/2005 | Cartier et al. | |
| 6,973,746 B2 | 12/2005 | Auger et al. | |
| 7,065,820 B2 | 6/2006 | Meschter | |
| 7,089,691 B1 | 8/2006 | Silvera | |
| 7,118,643 B1 | 10/2006 | Mellet et al. | |
| 7,178,268 B2 | 2/2007 | Trommer | |
| 7,313,876 B2 | 1/2008 | Morgan et al. | |
| 7,314,125 B2 | 1/2008 | Smaldone et al. | |
| 7,647,709 B2 | 1/2010 | Reilly et al. | |
| 7,752,695 B2 | 7/2010 | Kaufman et al. | |
| 2003/0121179 A1 | 7/2003 | Chen | |
| 2004/0172855 A1 | 9/2004 | Aslanides | |
| 2004/0216331 A1 | 11/2004 | Cheng | |
| 2004/0261295 A1 | 12/2004 | Meschter | |
| 2005/0282454 A1 * | 12/2005 | Meschter | A41D 1/04 |
| | | | 442/306 |
| 2006/0185191 A1 * | 8/2006 | Crowley | A43B 13/181 |
| | | | 36/28 |
| 2006/0225305 A1 | 10/2006 | Morgan et al. | |
| 2007/0000589 A1 | 1/2007 | Mellet et al. | |
| 2007/0033831 A1 | 2/2007 | Aveni | |
| 2007/0039204 A1 | 2/2007 | Wyszynski et al. | |
| 2007/0090575 A1 | 4/2007 | Chen | |
| 2007/0199211 A1 | 8/2007 | Campbell | |
| 2007/0209743 A1 | 9/2007 | Mellet | |
| 2007/0256326 A1 | 11/2007 | Jarvis | |

FOREIGN PATENT DOCUMENTS

| | | |
|---|---|---|
| FR | 2454899 A1 | 11/1980 |
| JP | 11042103 A | 12/2008 |

\* cited by examiner

DECORATED SOLE ELEMENTS FOR ARTICLES OF FOOTWEAR AND PROCESSES FOR MAKING THEREOF

CROSS-REFERENCE

The present invention is a continuation application of U.S. Ser. No. 12/271,166 filed Nov. 14, 2008, which application is hereby incorporated by reference in its entirety.

FIELD OF THE INVENTION

The present invention relates to articles of footwear and sole assemblies for articles of footwear. More particularly, various examples of the invention relate to applying graphic elements to sole elements for articles of footwear.

BACKGROUND OF THE INVENTION

A conventional article of athletic footwear includes two primary elements, an upper and a sole structure. The upper provides a covering for the foot that securely receives and positions the foot with respect to the sole structure. The sole structure is secured to a lower portion of the upper and is positioned between the foot and the ground. In addition to attenuating ground reaction forces, the sole structure may provide traction and control foot motions. The upper and the sole structure operate cooperatively to provide a comfortable structure that is suited for a variety of ambulatory activities, such as walking and running.

The sole structure of athletic footwear generally exhibits a layered configuration that may include a comfort-enhancing insole, a resilient midsole, and a ground-contacting outsole that provides both abrasion-resistance and traction. The insole is a thin, compressible member located within the upper and adjacent to a plantar (i.e., lower) surface of the foot to enhance footwear comfort. The midsole is generally the primary sole structure element that attenuates ground reaction forces and controls foot motions. Polymer foam materials suitable for the midsole include ethylvinylacetate or polyurethane, which compress resiliently under an applied load to attenuate ground reaction forces created by the impacts of running and jumping. In addition to polymer foam materials, midsoles may include, for example, one or more fluid-filled bladders and other impact-attenuating devices. The outsole forms the ground-contacting element of footwear and is usually fashioned from a durable, wear-resistant material, such as a carbon-black rubber compound, that may include texturing to improve traction.

Certain articles of footwear have midsole assemblies that include a top layer and a midsole assembly formed of a plurality of support elements. For example, an article of footwear, commercially manufactured and distributed by NIKE, Inc. under the SHOX trademark, includes a midsole having a top layer made of a conventional impact force attenuating material and a midsole assembly. The midsole assembly in at least some of these articles of footwear includes a top plate, a bottom plate and a plurality of support elements disposed between the top plate and the bottom plate. Examples of such midsole assemblies can be found in the disclosures of U.S. Pat. No. 6,964,120, entitled "Footwear Midsole with Compressible Element in Lateral Heel Area," issued to Cartier et al. on Nov. 15, 2005, and U.S. Pat. No. 7,314,125, entitled "Impact Attenuating and Spring Elements and Products Containing Such Elements," issued to Smaldone et al. on Jan. 1, 2008, each of these patents being incorporated by reference herein in their entireties.

The sole provides a multiplicity of utilitarian functions, but it may also serve to personalize the article of footwear. Thus, applying brand information, colors, decorations, etc. to the soles of footwear may be desirable. A variety of techniques for creating decorated soles have been developed.

For example, a sole element comprised of three layers—a chassis, a transparent skin, and a film having a color and/or design sandwiched therebetween—is disclosed in U.S. Pat. No. 7,089,691. It is disclosed that the chassis and the skin are integrally formed (via "reverse injection" or "dual injection") and that all three layers are able to chemically bond to one another.

As another example, a sole element is formed by liquid molding a sole composition to a printed membrane laminate is disclosed in U.S. Patent Publication No. 2004/0216331. The membrane laminate is formed by printing colors onto a polymeric porous membrane and subsequently laminating a protective layer over the printing to protect the printing and make it waterproof.

Many of the graphics that result from these methods of decorating the soles of footwear are of questionable durability, of questionable graphic quality, or both. It would be desirable to incorporate durable graphics of photographic quality into the sole of an article of footwear. Accordingly, it would be desirable to provide high-quality decorated midsoles for footwear that are easy to produce and that can withstand the wear and tear associated with the soles of articles of footwear.

BRIEF SUMMARY OF THE INVENTION

Various aspects of this invention relate to decorated sole elements for footwear. Some aspects of the invention relate to footwear having such decorated sole elements.

According to one aspect of the invention, methods of forming decorated midsole elements for articles of footwear are provided. The methods include obtaining a decorated film having one or more graphic elements applied to a first surface of the film and placing the decorated film in a mold. The methods further include obtaining a midsole element, placing the midsole element in the mold, and applying pressure to the mold to form a midsole element having a decorated surface.

The molded midsole element may be a top layer configured for direct attachment to an upper of the article of footwear. The decorated film may include a layer of polyether-block co-polyamide polymer. The midsole element may be formed of compression molded ethylvinylacetate.

Further, the step of obtaining the decorated film may include applying one or more graphic elements to a first surface of the film. The step of applying a graphic element may include silk-screening ink onto the film.

According to another aspect of the invention, methods of forming midsole assemblies for articles of footwear include joining one or more of the midsole support elements to the decorated film of the decorated midsole element.

According to a further aspect of the invention, articles of footwear according to examples of this invention include decorated midsole assemblies joined to uppers.

According to even another aspect, articles of footwear include an upper and a midsole assembly secured to the upper. The midsole assembly includes a decorated top layer having a ethylvinylacetate substrate and a decorated polyether-block co-polyamide polymer film. The midsole assembly further includes a plurality of midsole support elements. One or more of the midsole support elements may be substantially shaped as a pedestal or column (e.g., a foam column) and one or more of the midsole support elements are joined to the decorated top layer. An outsole may be joined to the lower surface of one or more of the midsole support elements. Further, a top plate may be interposed between the polyether-block co-polyamide polymer film of the decorated top layer and the upper surfaces of one or more of the midsole support elements.

According to another aspect of the invention, midsoles for articles of footwear include a top layer configured for attachment to an upper of the article of footwear, wherein the top layer includes a molded substrate and a decorated film, and a midsole support assembly at least partially attached to the decorated film of the top layer. The decorated film may include a polyether-block co-polyamide polymer, and the substrate may be formed from ethylvinylacetate. The midsole assembly may further include a plurality of midsole support elements, wherein one or more of the midsole support elements are substantially shaped as pedestals or columns. The top surfaces of one or more of the midsole support elements may be directly joined to the decorated film of the top layer. A web may couple one or more of the midsole support elements to one another.

BRIEF DESCRIPTION OF THE DRAWINGS

The foregoing Summary, as well as the following Detailed Description, will be better understood when read in conjunction with the accompanying drawings.

The figures referred to above are not necessarily drawn to scale, should be understood to provide a representation of particular aspects of the invention, and are merely conceptual in nature and illustrative of the principles involved. Some features of the article of footwear depicted in the drawings may have been enlarged or distorted relative to others to facilitate explanation and understanding. The same reference numbers are used in the drawings for similar or identical components and features shown in various alternative aspects. Articles of footwear as disclosed herein would have configurations and components determined, in part, by the intended application and environment in which they are used.

DETAILED DESCRIPTION OF THE INVENTION

The following discussion and accompanying figures disclose a decorated sole and an article of footwear having a decorated sole in accordance with various aspects of the present invention. Although concepts related to the sole are disclosed with reference to an article of athletic footwear, the sole is not limited to use with footwear designed for athletic activities. Thus, the sole according to various aspects of the invention may be incorporated into footwear that is generally considered to be non-athletic, including a variety of dress shoes, casual shoes, sandals, and boots.

Figure 1:
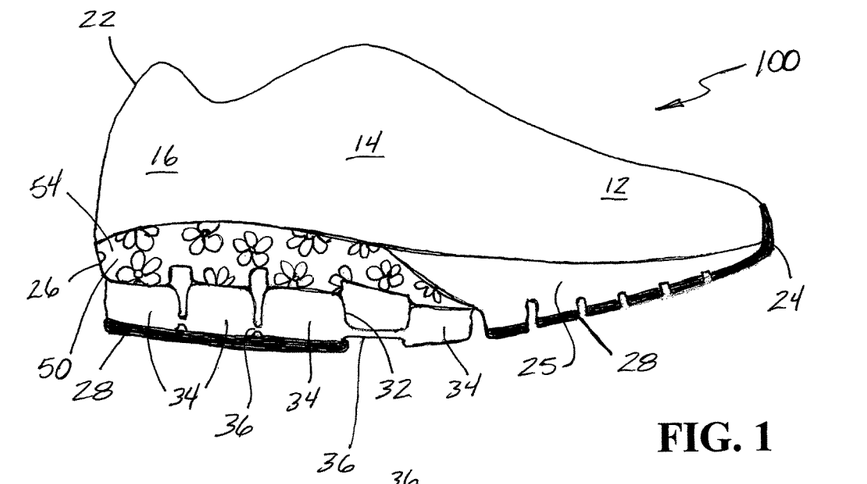
FIG. 1 is a side elevation view of an article of footwear according to an aspect of the present invention.
Figure 2:
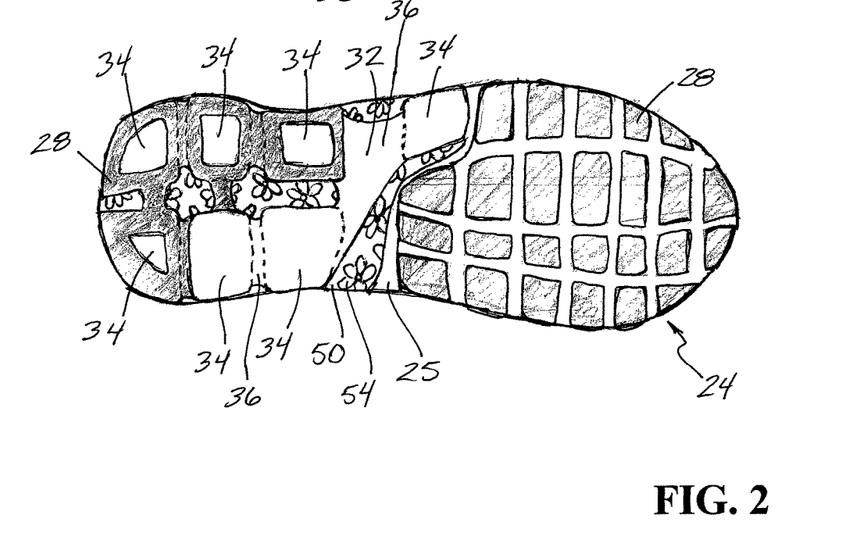
FIG. 2 is a bottom view of the article of footwear of FIG. 1.
Figure 3:
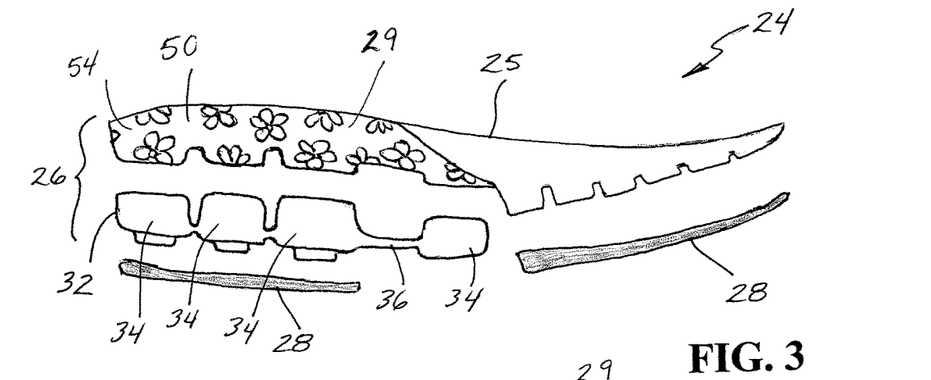
FIG. 3 is an exploded side view of the sole assembly of the article of footwear of FIG. 1.
Figure 4:
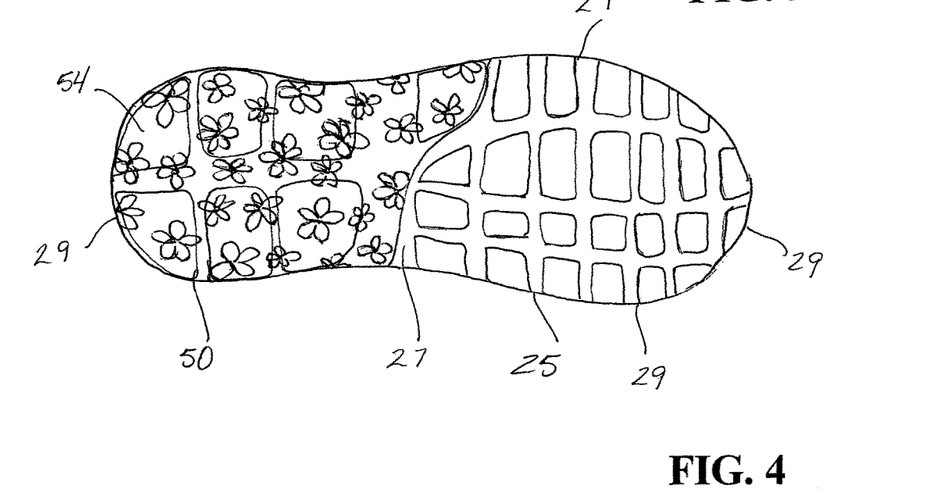
FIG. 4 is a bottom view of a decorated midsole according to the aspect of FIG. 1.

The present invention may be embodied in various forms. One aspect of an article of footwear 100 is shown in FIGS. 1 and 2. For purposes of general reference, footwear 100 may be divided into three general portions: a forefoot portion 12, a midfoot portion 14 and a heel portion 16. Portions 12, 14 and 16 are not intended to demarcate precise areas of footwear 100. Rather, portions 12, 14 and 16 are intended to represent general areas of footwear 100 that provide a frame of reference during the following discussion.

Footwear 100 includes an upper 22 and a sole assembly 24 secured to upper 22. Sole assembly 24 may be secured to upper 22 by an adhesive, or any other suitable fastening means, including, for example, stitching, sewing, laser welding, fusing techniques, mechanical connectors, etc. Upper 22 receives and secures footwear 100 to a foot of a wearer. Sole assembly 24, which is disposed between the foot of the wearer and the ground, provides attenuation of ground reaction forces, traction, and may assist in controlling foot motions, such as pronation. As with conventional articles of footwear, sole assembly 24 may include an insole (not shown) located within upper 22, a midsole assembly 26, and an outsole 28. In certain aspects, sole assembly 24 may not include an outsole layer separate from midsole assembly 26 but, rather, the outsole may comprise a bottom surface of midsole assembly 26 that provides the external traction surface of sole assembly 24.

Midsole assembly 26 is attached to upper 22 and generally functions as the primary shock-attenuating and energy-absorbing component of footwear 100. Midsole assembly 26 may extend all or part of the way along the length or width of the article of footwear 100. Further, midsole assembly 26 may be formed as a single piece or as multiple pieces. Midsole assembly 26 may include a sole element or top layer 25 made with an impact force attenuating material such as a compression-molded ethylvinylacetate, e.g., phylon. In another aspect, the impact force attenuating material may include a polyurethane foam, a microcellular elastomeric foam, or other suitable foams. Alternatively, top layer may be formed with a natural or synthetic rubber. Top layer 25 may further be formed as a composite material and/or as a plurality of layers of different materials. Typically, top layer 25 is directly secured to upper 22. Top layer 25 may extend all or part of the way along the length or width of the article of footwear 100. Further, top layer 25 may be formed as a single piece or as multiple pieces. As will be described below in more detail, top layer 25 includes a graphic membrane 50.

Midsole assembly 26 may further include one or more support assemblies 32. Each support assembly 32 in this illustrated example structure includes a one or more elastomeric support elements 34 (made, for example, from polymeric materials, such as polyurethane or ethylvinylacetate foams or other flexible or compressible materials). Support elements 34 serve to attenuate shocks and absorb energy as footwear 100 contacts the ground. Each support element 34 may be formed of a compressible elastomeric material and/or may include one or more compressible elements for attenuating ground reaction forces. Support assembly 32 may include an array of support elements 34, i.e., a plurality of support elements 34 may be arranged to stand adjacent one another with gaps therebetween. In one aspect, support elements 34 may be substantially shaped as pedestals or columns, i.e. support elements 34 may have an upper surface, a lower surface and one or more side surfaces extending therebetween, wherein the side surfaces are substantially unattached to other elements. Support elements 34 may have any suitable cross-sectional shape, such as circular, elliptical, polygonal, etc., as would be apparent to a person of ordinary skill in the art given the benefit of this disclosure.

As shown in FIG. 1, an array of one or more support elements 34 may be joined by a web 36. Web 36 may be located anywhere between an upper surface and lower surface, inclusive, of support elements 34. In certain aspects, support elements 34 and web 36 may be of unitary, i.e., one-piece, construction. In other aspects, web 36 is a separate element secured to support elements 34 via a friction fit, with adhesive or other suitable fastening means, etc. Web 36 may bridge the gap between adjacent support elements 34, while still maintaining the separate identity of the support elements. Suitable materials for support elements 34 and web 36 include rubber, polyurethane foam, microcellular elastomeric foams, or ethylvinylacetate (EVA) foam. Other suitable materials for support elements 34 and for web 36 will become readily apparent to those skilled in the art, given the benefit of this disclosure.

In the illustrated aspect, support assembly 32 is provided in heel portion 16 of footwear 100. Although the illustrated aspect shows midsole assembly 26 having a single support assembly 34, it is to be appreciated that any number of support assemblies can be provided in sole assembly 24, in any desired locations. Further it is to be appreciated that support assembly 32 may be provided in the heel portion 16, the midfoot portion 14, the forefoot portion 12, or any combination thereof. Even further, it is to be appreciated that support assembly 32 may be provided as a single integrated support assembly, or a plurality of support assemblies 32 may be provided as distinct support assemblies, optionally spaced from one another by gaps.

In the illustrated aspect, outsole 28 is secured to a lower surface of web 36 in the heel portion 16 of footwear 100 and continues under the midfoot and forefoot portions 14, 12 where it is attached directly to top layer 25 of midsole assembly 26. A bottom surface of outsole 28 may contact the ground during ambulatory activities. In certain aspects, footwear 100 may not include an outsole; rather, the support assembly itself may provide the ground-contacting surface. Suitable materials for outsole 28 include traditional rubber or rubber-like materials. Abrasion- or wear-resistant materials may be incorporated into the outsoles. Other suitable materials for outsole 28 will become readily apparent to those skilled in the art, given the benefit of this disclosure.

According to an aspect of the present invention, a sole element such as top layer 25 of midsole assembly 26 includes a graphics membrane 50. In one aspect, graphics membrane 50 includes a film 52. For example, film 52 may be a Pebax® film material (such as Pebax® 4033 or Pebax® 5033). By way of non-limiting example, film 52 may be approximately 100 to 700 microns thick. Film 52 may include more than one layer. As examples, film 52 may include two, three or more layers of Pebax® film material or film 52 may be a composite film, such as a nylon-12 layer bonded to a Pebax® 6333 layer. By way of non-limiting example, film 52 may be extruded, blown, cast, drawn, co-extruded and/or laminated.

Graphics membrane 50 further includes a graphics element 54. Graphics element 54 may be applied to film 52 in any of a variety of methods. Graphic elements 54 may be applied to film 52 as ink via printing, such as via a silk-screening process, a digital printing process, an ink jet printing process or other types of printing processes that are conventionally known and/or used in the art. In the case of a silk-screening process, one or more silk-screens may be created—with one screen created per each color to be applied. The most suitable characteristics of the screen mesh for the silk-screening process are determined by the ink manufacturer's recommendation or, if necessary, by experimentation. Depending upon the ink and its dilution, multiple screening passes may be preferred to achieve the desired opacity of the graphics. Further, when applying light colors over dark substrates, a base intensifier ink layer, such as a base white intensifier ink, may be desired.

As another example, graphics element 54 may be supplied on release paper and then transferred to film 52 using a sublimation technique. Generally a sublimation process uses heat and pressure to transfer the graphics element 54 from the transfer paper to the film. If film 52 is a multilayer film, such as the nylon/Pebax® film described above, graphics element 54 may be applied to any of the surfaces, including between the layers if, for example, one of the layers is transparent or translucent.

As even another example, graphics element 54 may be applied to film 52 via a dye process. In its simplest case, film 52 may be dipped into a vat with colorant. Optionally, dye may be applied to only one surface of film 52.

Figure 8A:
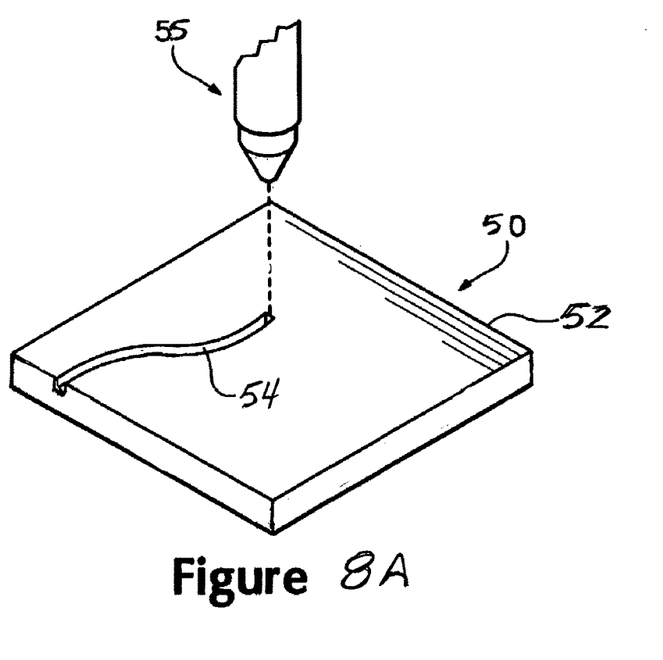
FIGS. 8A and 8B are schematic illustrations of methods of forming graphic membranes according to other aspects of the invention.
Figure 8B:
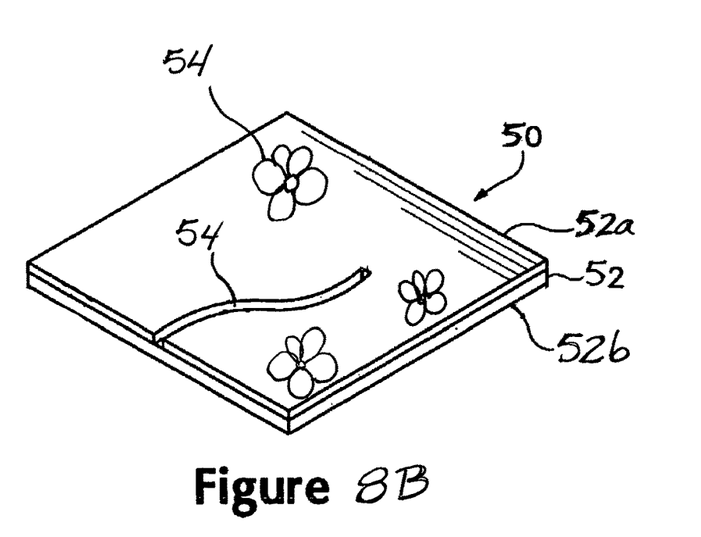

Referring to FIGS. 8A and 8B, as another example, graphics element 54 may be applied to film 52 as cutouts. In one aspect, graphic elements 54 may be applied to film 52 via a laser 55 and a laser etching process, such as that disclosed in U.S. Pat. No. 7,065,820 to Meschter, titled "Article and Method for Laser-Etching Stratified Materials," issued Jun. 27, 2006, and in US Patent Publication 2004/0261295 to Meschter, titled "Article and Method for Laser-Etching Stratified Materials," published Dec. 30, 2004, both incorporated herein by reference in their entireties. In a laser etching process, a layer of film 52 may be incised so as to expose the material beneath. The laser etching process may be most suitable when film 52 is a stratified material, including, for example, a laminate material. Further, as best shown in FIG. 8B, film 52 may be formed as a multi-layered laminated film, wherein a first layer 52a of the laminated film has cutouts that allow a second layer 52b to be viewed. By way of non-limiting example, film 52 may be formed as a co-extruded laminate film, wherein the layers of the laminate include a first colored layer (say, red) and a second colored layer (say, purple). The purple layer of the co-extruded laminate film may be laser etched (or otherwise provided with cutouts) to selectively expose portions of the red layer beneath.

In a further example, a plurality of graphic elements 54 could be applied to the same film. For instance, film 52 may be silk-screened on one surface and then laser etched to selectively remove a portion of the silk-screened graphic elements, thereby exposing the underlying material.

The thickness of film 52 may be selected to assist in the production of high quality graphic elements. In general, increasing the thickness of film 52 results in less deformation of the film during the molding process and therefore less deformation or distortion of the finished graphic elements.

Graphic elements 54 may be used to apply logos, brand names, manufacturing or source indicia, style identification, size, etc. Graphic elements may be used to apply colored patterns, including mono-colored or multi-colored patterns. Further, graphic elements may include reflective, phosphorescent, etc. components.

Figure 5:
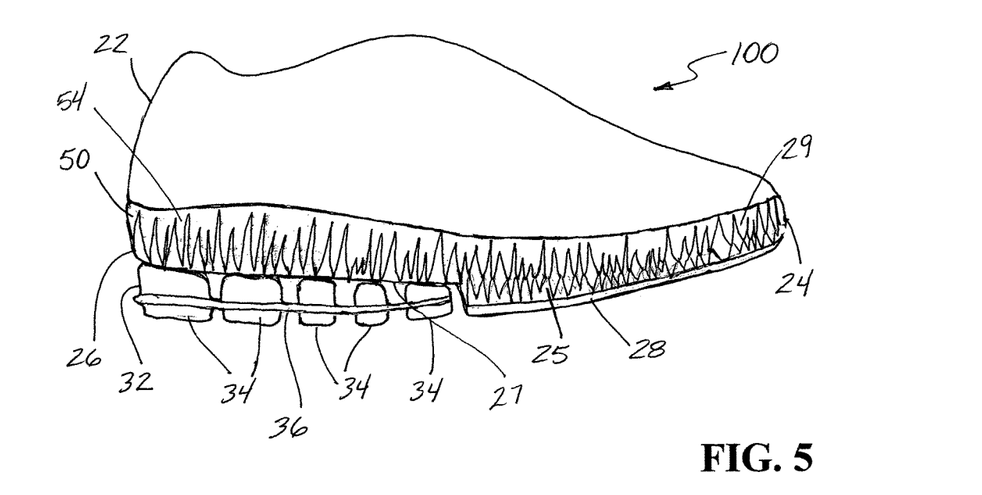
FIG. 5 is a side elevation view of an article of footwear according to another aspect of the present invention.

As noted above, and as best shown in FIGS. 1-4, in certain aspects of the invention, graphic membrane 50 is applied to at least some portions of a surface of top layer 25. Graphic membrane 50 may be applied over the entire top layer 25 or to only a portion of top layer 25. For example, referring to FIGS. 1-4, graphics membrane 50 may be applied to the lower and/or side surfaces 27, 29 of top layer 25 in heel portion 16 and at least a part of midfoot portion 14. In FIG. 5, graphic membrane 50 is applied to the entire lower surface 27 and side surfaces 29 of top layer 25. Optionally, for example, graphic membrane 50 may be applied to only the forefoot portion 12 or only to the side surfaces 29, if desired. As would be apparent to a person of ordinary skill in the art, given the benefit of this disclosure, graphic membrane 50 may be applied to any portion of top layer 25.

Figure 7:
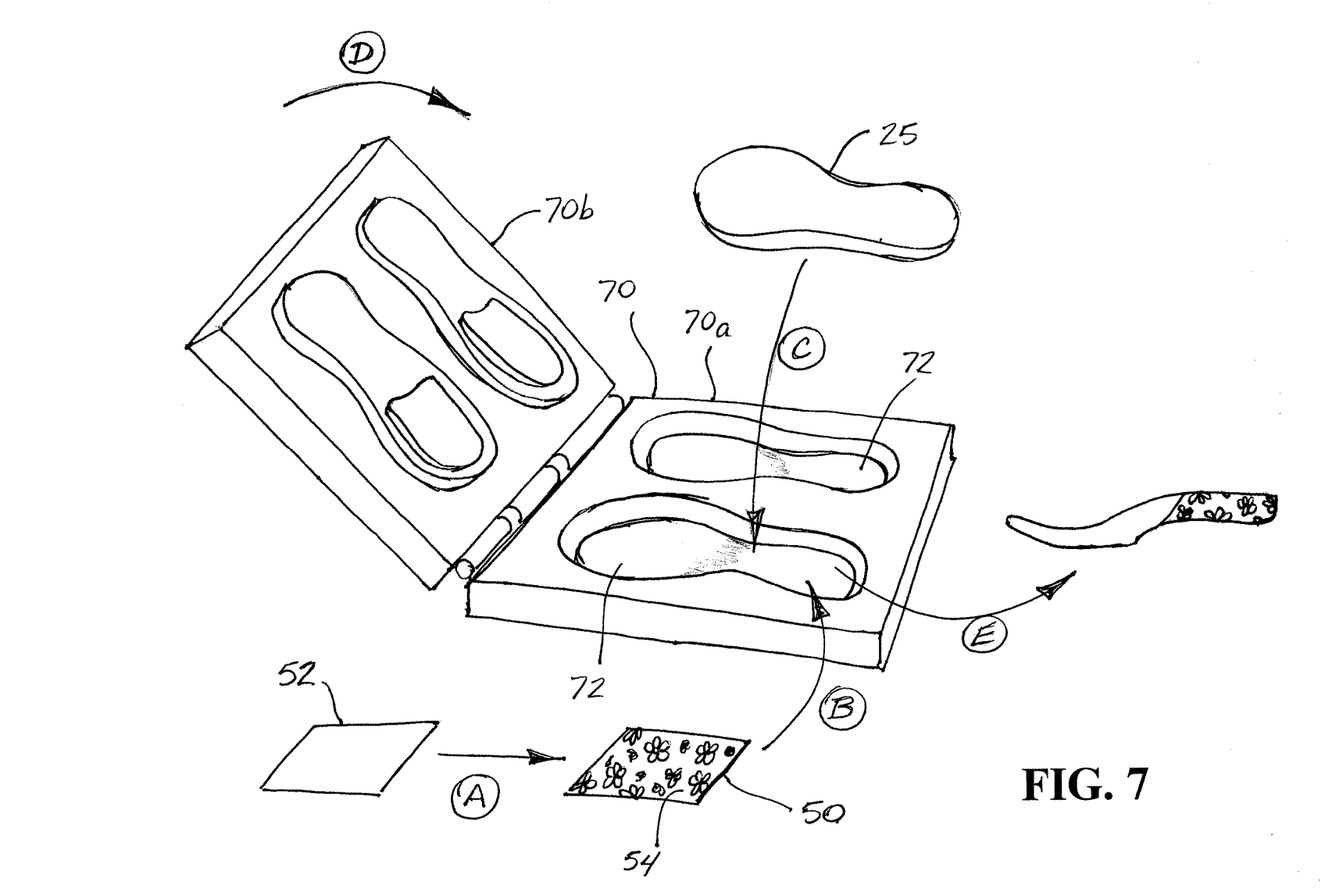
FIG. 7 is a schematic illustration of a method of forming a decorated sole element according to an aspect of the invention.

Referring to FIG. 7, after graphic elements 54 are applied to film 52 (step A), the graphics membrane 50 is transferred to a mold 70 (step B) having a mold cavity 72. Mold 70 may be a two-piece compression mold, for example, with mold halves 70a, 70b. Top layer 25 is then placed in mold 70 on top of graphics member 50 (step C). Mold 70 is closed (step D) and pressure and/or heat may be applied to the top layer 25 and the graphics membrane 50 within the mold 70 to co-mold graphics membrane 50 to top layer 25. The decorated top layer 25 is then removed from the mold (step E).

Prior to being placed in mold 70, top layer 25 may be supplied as a cured or partially-cured elastomeric or foamed substrate. For example, top layer 25 may be a partially-cured ethylvinylacetate pre-form that is placed into mold 70. Alternatively, top layer 25 may be supplied in sheet, pellet or granular form prior to being place into mold 70. For example, top layer may be supplied as a sheet of partially-cured rubber or as pellets of ethylvinylacetate. Even further, top layer 25 may be poured or injected into mold 70 as a liquid. As an example, liquid polyurethane may be poured into mold 70 on top of graphics member 50.

Thus, in accordance with an aspect of the invention, a method of forming a decorated sole element for an article of footwear includes obtaining a mold, placing a decorated film in the mold, placing an ethylvinylacetate sole element in the mold and applying pressure to the mold to form a sole element. The decorated film may be obtained by applying one or more graphic elements to a first surface of a polyether-block co-polyamide polymer film. Tests have shown that compression molding Pebax® films to an ethylvinylacetate substrate results in a relatively good bond.

Alternatively, the decorated sole element may be formed by placing the decorated film into a mold, closing the mold, injecting the substrate material into the mold, and co-curing the substrate material to the film.

The decorated sole element may then be incorporated into the sole assembly. For example, the top of support assembly 32 may be bonded directly to the decorated film of the decorated sole element. In one aspect, referring to FIGS. 1, 3 and 5, the graphic membrane 50 co-molded to top layer 25 may provide the decorated sole element with sufficient load distribution, stiffness, flexibility and resiliency characteristics such that the upper surface of the one or more support elements 34 may be secured directly to the decorated surface of top layer 25. Standard methods for bonding the support elements 34 to the decorated sole element may be used, as would be apparent to persons of ordinary skill in the art, given the benefit of this disclosure. As a non-limiting example, a primer may be applied first and then a solvent-based adhesive may be used to bond elements 34 to a decorated Pebax® film. Thus, the article of footwear 100 may be formed without the need for the top plate that has been typically incorporated into midsole support assemblies as disclosed in U.S. Pat. Nos. 6,964,120 and 7,314,125 discussed above. This may allow for a more flexible shoe, while still retaining a strong and reliable attachment of the midsole support assembly 32 to the top layer 25. Other advantages to eliminating the top plate may include ease of assembly, weight savings, cost savings, etc. Other, non-bonding, fastening devices may be used to attach support assembly 32 to the decorated sole element.

In another aspect, as best shown in FIG. 5, the lower surfaces of support elements 34 may form the ground-contacting surfaces of the article of footwear. In another aspect, referring to FIGS. 1-4 the lower surfaces of one or more support elements 34 may be secured to outsole 28.

Figure 6:
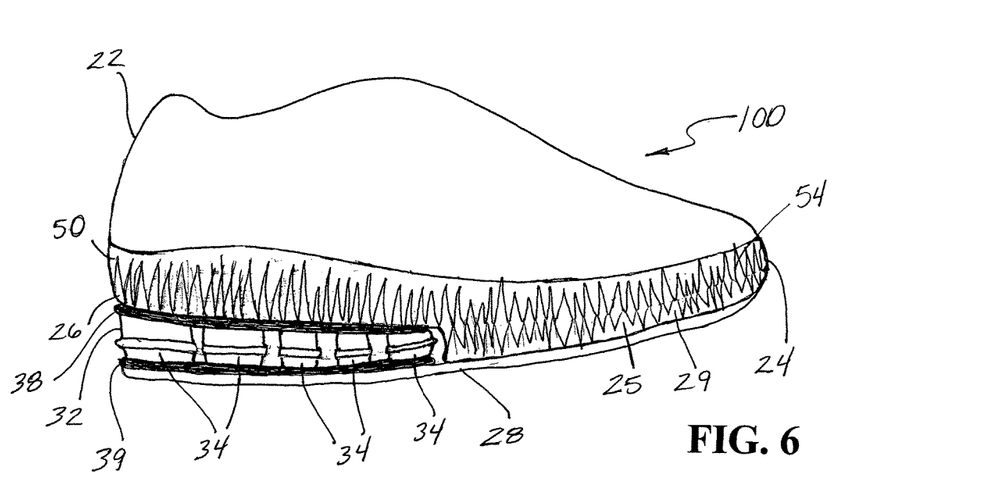
FIG. 6 is a side elevation view of an article of footwear according to a further aspect of the present invention.

In even another aspect, as best shown in FIG. 6, support assembly 32 may include a top plate 38 and/or a bottom plate 39. In such case, the plurality of support elements 34 are disposed between and attached to top plate 38 and bottom plate 39. The optional top plate 38 and/or the optional bottom plate 39 may be formed of a polymer, e.g., a polyether-block co-polyamide polymer (sold as Pebax® by ATOFINA Chemicals of Philadelphia, Pa.), nylon resins such as Zytel®, sold by Dupont, or polyurethane, for example. Other suitable materials for top plate 38 and bottom plate 39 will be readily apparent to those skilled in the art, given the benefit of this disclosure. Top plate 38 may be secured to the decorated film 50 of top layer 25 by adhesive or any other suitable fastening means.

The sole structures described herein may be applied to a wide range of athletic footwear styles, including tennis shoes, football shoes or other cleats, cross-training shoes, walking shoes, running shoes, soccer shoes, and hiking boots, for example. The sole structure may also be applied to footwear styles that are generally considered to be non-athletic, including dress shoes, loafers, sandals, and work boots. An individual skilled in the relevant art will appreciate, therefore, that the concepts disclosed herein apply to a wide variety of footwear styles, in addition to the specific style discussed in the following material and depicted in the accompanying figures.

Thus, while there have been shown, described, and pointed out fundamental novel features of various aspects, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described aspect to another are also fully intended and contemplated. It is the intention, therefore, to be limited only as indicated by the scope of the claims appended hereto. Further, all examples, whether demarcated by the terms "for example," "such as," "including," "etc." or other itemizing terms, are meant to be non-limiting examples, unless otherwise stated or obvious from the context of the specification.

What is claimed:
1. A midsole for an article of footwear comprising:
  a top layer configured for attachment to an upper of the article of footwear, wherein the top layer includes a midsole assembly comprising:
    an ethylvinylacetate substrate;

a graphics member including a polyether-block co-polyamide polymer film with graphics elements applied thereto as ink via printing;

wherein the graphics member is compression molded to the ethylvinylacetate substrate; and a midsole support assembly at least partially attached to the top layer.

2. The midsole of claim 1, wherein the graphics elements are printed by a silk-screening printing process.

3. The midsole of claim 1, wherein the graphics elements are printed by a digital printing process or by an ink jet printing process.

4. The midsole of claim 1, wherein the top layer further includes a stratified film attached to the graphics member, and wherein a surface of the stratified film has incisions that expose the graphics member underlying the surface.

5. The midsole of claim 1, wherein the graphics member comprises a multi-layered laminated film comprising a first layer and a second layer, wherein the second layer comprises the polyether-block co-polyamide polymer film and the first layer has cutouts that allow the second layer to be viewed.

6. The midsole of claim 1, wherein the midsole support assembly comprises a plurality of midsole support elements, wherein one or more of the plurality of midsole support elements is a pedestal having an upper surface, a lower surface and one or more side surfaces extending between the upper surface and the lower surface, wherein the one or more side surfaces are not directly attached to other ones of the plurality of midsole support elements.

7. The midsole of claim 6, wherein one or more of the plurality of midsole support elements has a top surface that is directly joined to the graphics member.

8. The midsole of claim 6, wherein one or more of the plurality of midsole support elements has a top surface that is directly joined to a top plate and the top plate is directly joined to the graphics member.

9. The midsole of claim 6, wherein more than one of the plurality of midsole support elements has a web that couples the more than one of the plurality of midsole support elements to one another.

10. The midsole of claim 9, wherein the web is co-molded with the plurality of midsole support elements.

11. The midsole of claim 1, wherein the midsole support assembly comprises a plurality of midsole support elements, wherein one or more of the plurality of midsole support elements is a pedestal having an upper surface, a lower surface and one or more side surfaces extending between the upper surface and the lower surface, wherein one or more of the side surfaces are not directly attached to other ones of the plurality of midsole support elements, wherein one or more of the plurality of midsole support elements are joined to the graphics member.

12. An article of footwear comprising:

an upper; and a midsole according to claim 1 attached to the upper.

13. The article of footwear of claim 12, wherein the graphics elements are printed by a silk-screening printing process.

14. The article of footwear of claim 12, wherein the graphics elements are printed by a digital printing process or by an ink jet printing process.

15. The article of footwear of claim 12, further comprising:

an outsole joined to a lower surface of the midsole assembly.

16. The article of footwear of claim 12, wherein the top layer further includes a stratified film attached to the graphics member, and wherein a surface of the stratified film has incisions that expose the graphic member underlying the surface.

17. The article of footwear of claim 12, wherein the graphics member comprises a multi-layered laminated film comprising a first layer and a second layer, wherein the second layer comprises the polyether-block co-polyamide polymer film and the first layer has cutouts that allow the second layer to be viewed.

18. The article of footwear of claim 12, wherein the midsole support assembly comprises a plurality of midsole support elements, wherein one or more of the plurality of midsole support elements is a pedestal having an upper surface, a lower surface and one or more side surfaces extending between the upper surface and the lower surface, wherein the one or more side surfaces are not directly attached to other ones of the plurality of midsole support elements.

19. The article of footwear of claim 18, wherein one or more of the plurality of midsole support elements has a top surface that is directly joined to the graphics member.

20. The article of footwear of claim 18, wherein the midsole assembly further includes a top plate interposed between the polyether-block co-polyamide polymer film of the top layer and the upper surface of the one or more of the plurality of midsole support elements.

\* \* \* \* \*